United States Patent [19]

Jönsson

[11] 4,440,729

[45] Apr. 3, 1984

[54] PROCEDURE FOR CHEMICAL, AUTOMATIC DISSOLUTION OF MOLYBDENUM CORE WIRE IN TUNGSTEN FILAMENT COIL AND A DEVICE FOR IMPLEMENTING THE PROCEDURE

[75] Inventor: Günther Jönsson, Karlskrona, Sweden

[73] Assignee: Lumalampan Aktiebolag, Karlskrona, Sweden

[21] Appl. No.: 302,215

[22] Filed: Apr. 14, 1981

[30] Foreign Application Priority Data

Sep. 12, 1980 [SE] Sweden .............................. 8006387

[51] Int. Cl.[3] .............................................. C01G 39/00

[52] U.S. Cl. ........................................ 423/55; 423/53; 75/101 R

[58] Field of Search .................. 423/53, 55; 75/101 R

[56] References Cited

U.S. PATENT DOCUMENTS 198,776 1/1978 Molloy et al. .

3,988,418 10/1976 Kerfort et al. ........................ 423/53

4,189,461 2/1980 Lueders et al. ...................... 423/53

*Primary Examiner*—Herbert T. Carter

*Attorney, Agent, or Firm*—Frishauf, Holtz, Goodman & Woodward

[57] ABSTRACT

The invention is directed to a process and apparatus for dissolving a molybdenum core wire in a tungsten filament coil which comprises reacting the filament coil in a sealed reaction vessel fitted with at least one liquid trap with an acid mixture containing nitric acid, sulfuric acid and water in the presence of an oxygen containing gas wherein the amount of the oxygen containing gas is controlled by a liquid level sensing device attached to the liquid trap. The invention enables efficient conversion of nitrogen oxide gases to nitric acid and recovery of molybdenum from the reaction vessel.

12 Claims, 7 Drawing Figures

Figure 1:
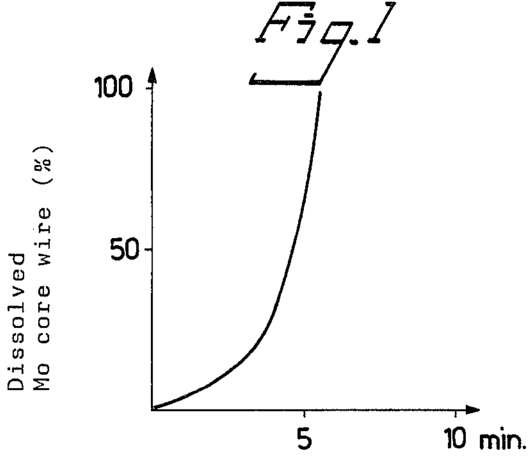

PROCEDURE FOR CHEMICAL, AUTOMATIC DISSOLUTION OF MOLYBDENUM CORE WIRE IN TUNGSTEN FILAMENT COIL AND A DEVICE FOR IMPLEMENTING THE PROCEDURE

The present invention is directed to an automated procedure for chemically dissolving molybdenum core wire in tungsten filament coils for light sources by means of a mixture of nitric acid, sulphuric acid and water. A device, embracing a reaction vessel fitted with a heat exchange jacket, with the necessary supply and discharge pipes and connected to a liquid trap, has been invented for implementing the procedure.

When tungsten filament coils are produced for light sources, the filament is spiralled around a core wire of molybdenum. Chemical dissolution is the method which has been applied heretofore for removing the core wire before the filament coil can be used in the manufacture of light sources. The core wire is dissolved as molybdic-acid in a mixture of nitric acid, sulphuric acid and water. Heat and comparatively large quantities of environmentally dangerous $NO_x$ gas are released when this procedure is adopted for removing the core.

A manual method for core removal was formerly applied within the lamp industry. This involved the use of a mixture of 7 moles of nitric acid, 6 moles of sulphuric acid and 25 moles of water as core removal acid. Filament coils with a total weight on the molybdenum core wire of about 50 g were placed in an acid bath of this type. The work was carried out in a fume cupboard with powerful exhaust fans. These fans merely removed the nitrous gases which had been formed and discharged them to the atmosphere. The method was later automated and the coil sets cored out in this way now contain about ten times as much molybdenum. Since the core removal reaction is highly exothermic, an irregular cycle occurs and the nitrous gases which are formed must be treated with in scrubbers with alkali and acid treatment. Despite this treatment, significant quantities of nitrous gases pass through the cleaning arrangements due to the rapid reaction cycle with large instantaneous values for the formation of nitrous gases. Although numerous expensive absorption stages have been tested, it has not been possible completely to avoid the discharge of nitrous gases to the atmosphere. Attempts have been made to precipitate the molybdenum, usually by means of co-precipitation with gypsum, as a result of which calcium molybdate is formed. This product must then be transported to a waste plant for storage.

Using acid for removing cores from filament coils entails oxidizing the molybdenum in the core wire by means of nitric acid to form molybdic acid ($MoO_3.nH_2O$) while the nitric acid is reduced to nitrous gases ($NO+NO_2$). The sulphuric acid is used as a secondary "solvent" for the molybdic acid during the formation of easily dissolved, complex molybdyl ($MoO^{4+}$) or molybdenyl ($MoO_2^{2+}$) associations. This reaction is a prerequisite for a correctly implemented coring out operation.

It is also assumed that the tungsten filament coil is not damaged as a result of chemical attack. Like molybdenum, tungsten is also primarily oxidized by the nitric acid. The tungsten filament coil is, however, immediately passivated in the highly acidic medium by sparingly soluble tungstic acid ($H_2WO_4$) which is formed and which deposits itself as an extremely thin, protective film on the coil surface. As a result of this protective film, all further attacks on the tungsten filament coil are halted.

The new procedure is implemented in a reactor specially invented for this purpose. A comparatively large number of coils per batch (up to 600,000 of type 60 W 225 V, corresponding to about 12 kg Mo) can be cored out at one time in this reactor. The procedure also permits dissolution of amounts of Mo greater than 12 kg. The $NO_x$ gas thus formed in the reactor is converted to nitric acid. When nitric acid is reformed, oxygen is consumed in the reaction vessel, thus lowering the gas pressure in the reaction vessel. This condition is maintained throughout the entire reaction cycle.

A marked advantage of the new core removal procedure is that the process acid is used far more efficiently than previous techniques. This facilitates the recovery of the commercially valuable molybdenum. Consequently, the environmental problem caused by this heavy metal can be solved in a profitable manner.

The chemical reactions for the cycles included in the process can be written in accordance with the following tables.

a. Dissolution of molybdenum $$Mo(s)+2HNO_3(l) \rightarrow H_2MoO_4(s+l)+2NO(g) \quad \text{I.}$$

$$Mo(s)+6HNO_3(l) \rightarrow H_2MoO_4(s+l)+6NO_2(g)+2H_2O(l) \quad \text{II.}$$

$$H_2MoO_4(s)+2H_2SO_4(l) \rightarrow MoO_2(HSO_4)_2(l)+2H_2O(l) \quad \text{III.}$$

$$H_2MoO_4(s)+4H_2SO_4(l) \rightarrow MoO(HSO_4)_4(l)+3H_2O(l) \quad \text{IV.}$$

At a temperature of 25°-60° C., oxidation mainly takes place in accordance with formula I. The heat developed is about 300 $kJ \cdot mol^{-1}$ of oxidized Mo.

| b. Reconversion to nitric acid | |
|---|---|
| V. | $6\ NO + 3\ O_2 \rightarrow 6\ NO_2$ |
| VI. | $6\ NO_2 + 3\ H_2O \rightarrow 3\ HNO_3 + 3\ HNO_2$ |
| VII. | $3\ HNO_2 \rightarrow HNO_3 + 2\ NO + H_2O$ |
| VIII. | $4\ NO + 3\ O_2 + 2\ H_2O \rightarrow 4\ HNO_3$ ($\Delta H = -599$ kJ at 18° C.) |

When the nitric acid is reformed, about 150 $kJ \cdot mol^{-1}$ is thus released.

$$2NO(g)+HNO_3(l)+3H_2SO_4(l) \rightleftarrows 3NOHSO_4(l)+2H_2O(l) \quad \text{IX.}$$

$$2NO_2(g)+H_2SO_4(l) \rightleftarrows NOHSO_4(l)+HNO_3(l) \quad \text{X.}$$

The purpose of the present invention is to provide a means of dissolving molybdenum core wire in tungsten filament coils for light sources in a controlled manner so that the nitrous gases which are formed can be retained in the reaction vessel and reconverted to nitric acid, thus avoiding the discharge of nitrous gases to the atmosphere.

Another purpose is to make the process acid dissolve a sufficiently large quantity of molybdenum that the recovery of the heavy metal molybdenum from the acid becomes economically justified.

SUMMARY OF THE INVENTION

In order to achieve the advantages referred to, the procedure is implemented in such a way that tungsten filament coils are placed in a sealed reaction vessel containing an acid mixture and connected to a liquid trap. When the dissolution reaction has started and when a lowering of gas pressure has occurred in the reaction vessel as a result of part of the oxygen in the air contained in the reaction vessel having been absorbed by the nitrogen monoxide formed during the core removal reaction, oxygen is automatically metered into the vessel while retaining the lower pressure condition. The procedure is executed by a device which is characterized by a reaction vessel surrounded by a heat exchange jacket and provided with an inlet for supplying metered oxygen, an inlet and outlet for the heat exchange medium and for process acid and a connecting pipe to at least one liquid trap, which is fitted with a level-sensing (preferably a pressure-sensing) device, from which an impulse is generated to a valve for feeding in the oxygen.

Figure 2:
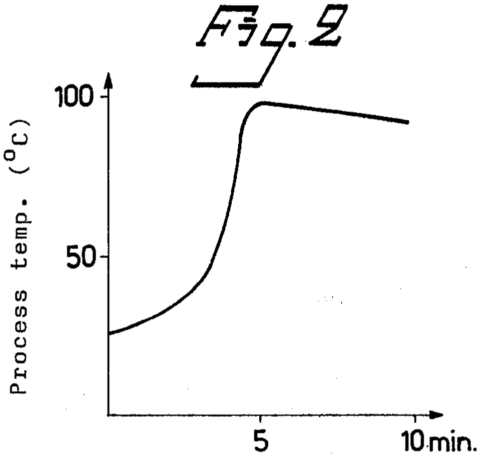
Figure 3:
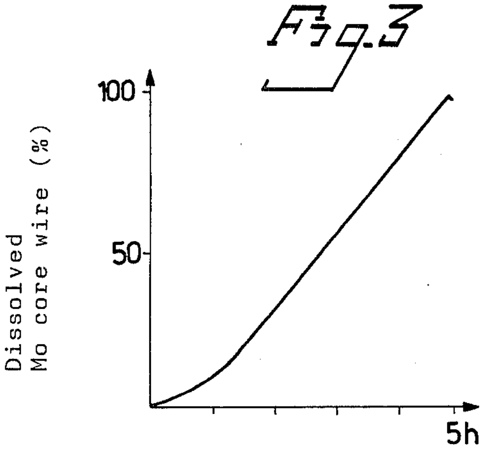
Figure 4:
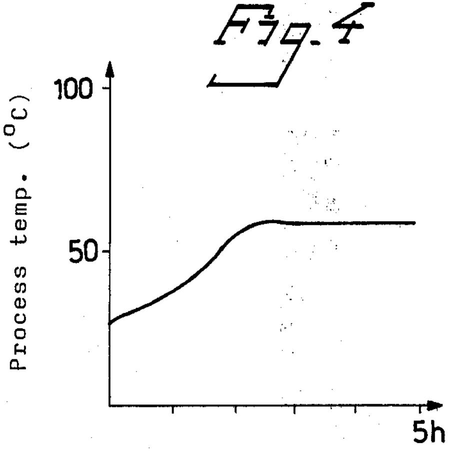
Figure 5:
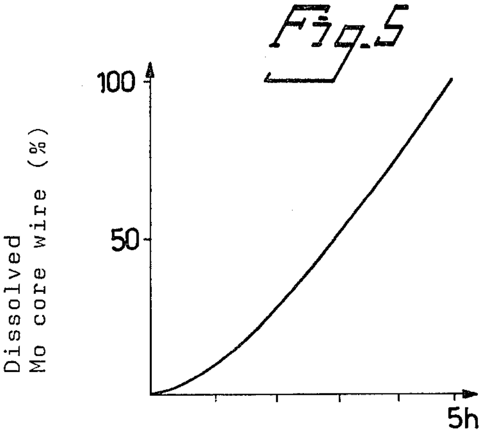
Figure 6:
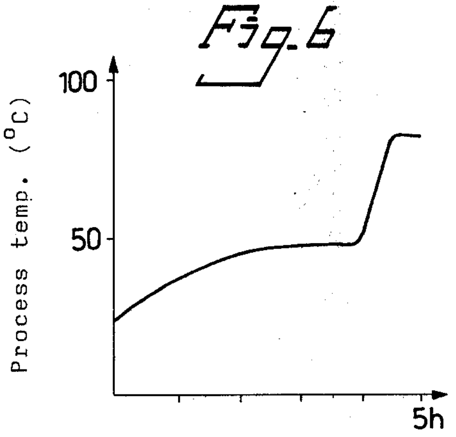

The manner in which the procedure is to be carried out is described below, first by means of the results of comparative experiments and then by means of a presentation of the mode of action of the arrangement invented for implementing the process. References will be made to subsequent drawings in which:

FIG. 1 presents a diagram showing the dissolution cycle for molybdenum core wire when applying the manual procedure described heretofore, FIG. 2 presents the temperature in the reaction vessel during this procedure, FIGS. 3 and 4 present, in a corresponding way, the cycle for the new procedure, when the reaction vessel is cooled only during the first hours of the process, and FIGS. 5 and 6 present the conditions when the reaction vessel is, in addition, heated during the last hour of the process.

Figure 7:
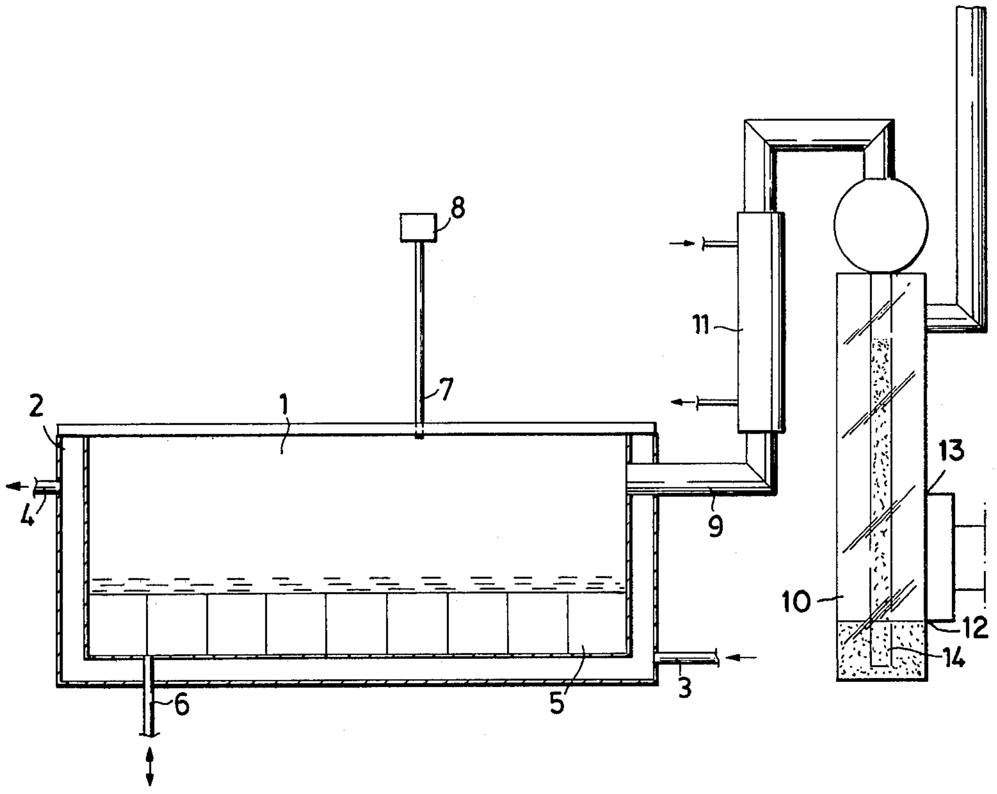

Finally, FIG. 7 presents one form of design for the arrangement in which the procedure is implemented.

3 600 60 W/225 V incandescent lamp coils containing about 80 g molybdenum core wire were cooled out in a 1 liter of acid mixture in all of the experiments.

Experiment Series A

Experiments of this type were carried out as reference experiments and the acid mixture used corresponds to the acid mixture used in the known manual procedure. In other words the acid mixture contained 7 moles of $HNO_3$, 6 moles of $H_2SO_4$ and 25 moles of $H_2O$ per liter. FIG. 1 shows the rapid reaction cycle, as a result of which the molybdenum core wire is dissolved after about 5 minutes. FIG. 2 shows the rapid temperature cycle when the temperature increases from room temperature to almost 100° C. in four minutes. Considerable quantities of nitrous gases were formed and their dissolution in the acid for reconversion to nitric acid was practically zero.

Experiment Series B

These experiments were carried out with the use of an acid mixture containing 3 moles of $HNO_3$, 13 moles of $H_2SO_4$ and 8 moles of $H_2O$ per liter. Like Series A, these experiments were carried out in a reaction container which is connected to the atmosphere via a liquid trap. Due to the comparatively low content of nitric acid, the dissolution reaction was considerably slower than in Series A and about 5 hours were required for complete dissolution. As a result, the dissolution cycle could be checked in such a way that the low pressure condition was maintained in the reaction vessel all the time. The reaction vessel was cooled during the first hours of the dissolution process so as to permit better control of the reaction cycle.

Experiment Series C

In these experiments an acid mixture with the same composition as that used in Series B was used but since the acid mixture was prepared from core-removal acid which had previously been used, it also contained molybdyl ions. The experiments were also varied by applying heat to the reaction vessel during the last hour of the dissolution process.

The following table presents values for the various parameters of this experiment.

| time (h) | temp. (°C.) | pressure (kPa) | $NO_2$ content in reactor "visual assessment" (vpm) | $NO_2$ content after liquid trap (vpm) |
|---|---|---|---|---|
| 0 | 24 | 0 | <100 | <100 |
| 0.1 | 25 | 0 | | ↓ |
| 0.5 | 31 | +0.1 | <100 | ↓ |
| 1.0 | 36 | +0.2 | 200-500 | ↓ |
| 1.5 | 42 | +0 | ↑ | ↓ |
| 1.7 | 43 | −0.1 | ↑ | ↓ |
| 2.0 | 46 | −1.6 | ↑ | ↓ |
| 2.5 | 47 | −1.0 | ↑ | ↓ |
| 3.0 | 47 | −1.6 | 100-1000 | ↓ |
| 4.0 | 48 | −1.6 | ↓ | ↓ |
| 4.2 | 60 | −1.0 | ↓ | ↓ |
| 4.5 | 80 | +0.6 | ↓ | ↓ |
| 5.0 | 80 | 0 | ↓ | ↓ |

Throughout the entire core removal cycle, the supply of $O_2$ was controlled with the aid of a pressure indicator in the liquid trap.

As can be seen from FIGS. 1-4, a considerable difference exists between the core removal cycles in accordance with Series A and those in accordance with Series B. The reason for this is completely dependent on the difference in the composition of the acid mixtures used in the respective experiments. Contrary to Series A, where the reactive acid mixture gave a completely uncontrollable core removal cycle, core removal in Series B took place at a slow rate. Core removal in accordance with Series B can be controlled comparatively simply throughout the entire cycle by controlling the process temperature. Control of the reaction rate for $Mo(s) \rightarrow Mo(1)$ (=rate of core removal) in fact constitutes the basic idea in the new procedure since it provides possibilities for immediately converting the $NO_X$ gas which has been formed to nitric acid.

When core removal is carried out with the proposed type of acid mixture (Series B and C), the dissolution of the molybdenum core wire mainly takes place according to reaction formulas I and III (IV): This was verified empirically by means of a large number of laboratory experiments.

The conversion of the resultant $NO_x$ gas to nitric acid in part follows the well-known pattern which applies when producing nitric acid (reaction forms V–VIII) and also a more complicated pattern in which the $NO_x$ gas reacts with $H_2SO_4$ during the formation of nitrosyl sulphuric acid and nitric acid (reaction formulas IX and X). Several partial-reactions in the conversion $NO_x(g) \rightarrow HNO_3(1)$ are highly exothermic. Consequently, the reconversion to nitric acid is favoured by a low process temperature. The equilibrium for reactions IX and X is displaced to the left when $[H_2O]$ and $[HNO_3]$ respectively increase, whereupon NO(g) and $NO_2(g)$ respectively are released. The reaction $NO_x(g) \rightarrow HNO_3(l)$ is thus favoured by the fact that the process acid contains the smallest possible quantity of water and nitric acid.

The experience obtained by means of laboratory experiments and application on a production scale agrees very well with the known theoretical data for the chemical system involved in the use of acid for coring out tungsten filament coils and this also applies to conversion of the resultant $NO_x$ gas to nitric acid.

The new procedure also offers excellent possibilities for recovering molybdenum in a comparatively simple manner from the consumed process acid. The recovery is considerably facilitated by the fact that the process acid can be used for core removal without any concomitant problem, even when the amount of dissolved molybdenum is very high, in other words when it approaches saturation. As a result, the process acid is supersaturated after no more than a moderate, further concentration, for example by driving off the light $H_2O$—$HNO_3$ fraction, and the solid phase of the crystallized molybdic acid can then easily be separated by means of filtration. The molybdic acid can then be converted to $MoO_3$ by means of heating.

The filtrate, which is composed of sulphuric acid and Mo in the amount of 200–250 g/l, is then recycled—after nitric acid and water have been added—to the reactor as core removal acid. In this way, the amount of dissolved Mo in the process acid before each core removal operation always remains at about the same level (140–180 g/l). This is an advantage when carrying out core removal in accordance with the proposed procedure since it contributes to the fact that the core removal reaction takes place under more stable conditions. One preferred form of design of the reactor used for the procedure is presented in FIG. 7. This consists of a reactor tank 1, surrounded by a heat exchange jacket 2, to which heat exchange medium inlet 3 and outlet 4 are connected. Cassettes 5, containing the tungsten filament coils from which the cores are to be removed, are placed in the reactor tank 1. The process acid containing 2.5 to 3.5 (preferably, 2.8 to 3.2) moles of $HNO_3$, 12 to 14 (preferably, 12.5 to 13.5) moles of $H_2SO_4$ and 7 to 9 (preferably, 7.5 to 8.5) moles of $H_2O$, can be supplied to the reactor tank by means of a combined supply and discharge pipe 6. Furthermore, an oxygen pipe 7 is connected to the reactor tank. A control valve 8 is mounted on this pipe. A discharge pipe 9, which is connected to the atmosphere via a liquid trap 10, runs from the reactor tank. A cooling water jacket 11 surrounds the discharge pipe 9. A lower level-sensing device 12 and an upper level sensing device 13 are mounted on the liquid trap 10. The liquid trap 10 contains a caustic soda solution.

The cores are removed from the filament coils in such a way that the filament coils are placed in cassettes 5 which have a cover and a bottom made of wire netting. When the cassettes have been placed on the bottom of reactor tank 1 and when the reactor tank has been sealed against the atmosphere, process acid is added through pipe 6. The dissolution of the molybdenum core wire begins immediately and the $NO_x$ gas which is formed mixes with the air above the acid surface. The use of a flat design for the reactor tank 1 provides a large contact interface between the acid and the air.

The NO gas combines with $O_2$ from the air and is dissolved in the process acid. As a result, a low pressure condition occurs in the reactor tank. This condition causes the caustic soda solution in the liquid trap 10 to be sucked up into an inner pipe 14. This cycle can be checked visually if the liquid trap is made of glass.

At the beginning of the core removal operation, when the process is highly exothermic, refrigerant is supplied to the heat exchanger jackets 2 through the inlet 3. The cooling jacket 11 on the discharge pipe 9 constitutes a safeguard for ensuring that vapourized acid condenses and returns to the reactor tank without entering the liquid trap. When the reaction has proceeded for a certain length of time, a sufficient quantity of oxygen has been consumed from air in the reactor tank to form a low pressure condition which causes the caustic soda solution in the liquid trap to be sucked down to its outer pipe until it is on a level with the lower level-sensing device 12. The lower level-sensing device 12 then generates an impulse to the control valve 8, which permits oxygen to enter through the pipe 7 in the reactor tank 1. Oxygen continues to enter until the pressure has increased to such an extent that the caustic soda solution reaches the upper level-sensing device 13. The control valve 8 then closes and a new cycle with the consumption of oxygen from the gas volume in the reactor tank is started.

When the core removal cycle has been completed, the process acid is removed through the pipe 6 and rinsing acid from a storage tank can be introduced through the same pipe 6 to the reactor tank 1. (The rinsing acid is mixed with the process acid for the next core removal cycle). In the same manner, one or more charges of rinsing water can be supplied and removed from the reactor tank. If it should be found suitable, several liquid traps can be connected in series in the discharge pipe 9. In this case, the first liquid trap can contain water and the second and subsequent liquid traps can contain a caustic soda soluton.

As distinct from known procedures, this new procedure means that a molybdic acid content corresponding to more than 240 g/l Mo is obtained in the process acid after the core removal operation. As a result, molybdenum can easily be recovered from the process acid. For this purpose, process acid is vapourized under vacuum ($P_{tot} \approx 10$ kPa) and at a temperature of about 150° C. The solution can be supersaturated fairly easily by driving off the light $HNO_3-H_2O$ fraction and the dissolved Mo will crystallize at a rapid rate. After cooling, the crystals can easily be separated from the sulphuric acid fraction with the aid of a ceramic filter. The sulphuric acid contains 200–250 g dissolved Mo per liter after filtration. The sulphuric acid containing Mo and the nitric acid fraction which has been driven off and which has condensed are then used for preparing new process acid for the core removal operation.

Consequently, the Mo content in the process acid always remains between 140 and 180 g/l before core removal takes place. The solid Mo fraction contains 20–30 percent by weight of sulphuric acid after filtration. The precipitate, which is dry to the touch, is hydroscopic and is converted to a highly viscous syrup-like solution after it has absorbed water. A number of different methods can be used for removing the remaining sulphuric acid from the precipitate, for example recrystallization of the oxide, driving off the acid, precipitating the molybdenum as ammonium molybdate, fluid extraction etc.

The best mode found to carry out the invention procedure is as follows. After the tungsten filament coils are charged in cassettes, which are placed in a reactor tank, the process acid containing between 140 and 180 g Mo/l is fed into the tank, after the tank has been sealed from the atmosphere. The core removal reaction starts slowly, and during the first half hour the temperature rises to about 30° C. During this period the amount of $NO_x$ gas formed is not dangerous. The pressure in the reactor tank may have risen above zero, since the heat from the reaction has had the air above the acid in the tank to expand.

In the next part of the core removal cycle the exothermic reaction goes so rapidly that the temperature in the reaction vessel tend to increase more than 0.2° C. per min. In this stage cooling of the reaction tank is performed by circulating a heat exchange medium in the heat exchange jacket surrounding the reaction tank. In this manner the temperature rise is controlled and kept at 0.2° C. per min. After two and a half hours the temperature in the reaction tank has reached 50±3° C., which is the temperature desired for maintaining the core removal process. In the case of small tungsten filament coils, i.e. 15 W/225 V, in the batch, the reaction may still require cooling, but normally it is not necessay. After four hours, the core removal process is almost ended, but to completely rid the tungsten filament coils of molybdenum core wire, the temperature in the reaction tank is raised to 80° C. This is carried out by introducing a heat medium in the heat exchange jacket for half an hour to raise the temperature to 80° C., which is maintained for another half hour to complete the core removal. During this last hour the pressure in the reaction tank can increase to above zero, because a minimal amount of $NO_x$ gas is generated, which means that no $O_2$ is consumed from the air in the reaction tank, and that the air is expanded by heat.

Finally, the process acid is drained from the reaction tank and the rinsing acid is pumped in to wash the filament coils.

It goes without saying that a high partial pressure of oxygen promotes the reforming of nitric acid. The best condition for that reaction is achieved between 30° and 40° C., not withstanding a reaction temperature of 50° C. is proposed. The reason for that is to get an acceptable reaction velocity.

I claim:

1. A process for dissolving a molybdenum core wire in a tungsten filament coil comprising:
(a) reacting said filament coil in a sealed reaction vessel fitted with at least one liquid trap with an acid mixture consisting essentially of 2.5 to 3.5 moles of nitric acid, 12 to 14 moles of sulfuric acid and 7 to 9 moles of water in the presence of an oxygen containing gas to thereby dissolve said core wire; and
(b) continuously monitoring the amount of said oxygen containing gas by a liquid level sensing device being capable of sensing the level of liquid in said liquid trap and comprising an upper and lower liquid level sensing region, said liquid level sensing device being connected to an oxygen containing gas supply, the amount of liquid in said liquid trap varying directly with the amount of oxygen containing gas in said reaction vessel, wherein when the level of liquid in said liquid trap is at the same level as said lower liquid level sensing region, said oxygen containing gas is supplied to said reaction vessel and when the level of liquid is at the same level as said upper liquid level sensing region, the supply of said oxygen containing gas is stopped.

2. The process of claim 1, wherein said liquid level sensing device is a pressure sensing device comprising an upper and lower pressure sensing region.

3. The process of claim 2, wherein when the level of liquid in said liquid trap is at the same level as said lower pressure sensing region the pressure of said oxygen containing gas in said reaction vessel is at about −1.6 kPa and when the level of liquid is at the same level as said upper pressure sensing region, the pressure of said oxygen containing gas in said reaction vessel is at about 0.6 kPa.

4. The process of claim 1, wherein said acid mixture contains 2.8 to 3.2 moles of nitric acid, 12.5 to 13.5 moles of sulfuric acid and 7.5 to 8.5 moles of water.

5. The process of claim 4, whrein said acid mixture contains 3 moles of nitric acid, 13 moles of sulfuric acid and 8 moles of water.

6. The process of claim 1, wherein said reaction is conducted at a temperature between room temperature and 60° C.

7. The process of claim 1 further comprising
(a) removing a spent acid mixture from the reaction vessel;
(b) separating said spent acid mixture into a first fraction containing crystallized molybdic acid and a second fraction containing sulfuric acid and dissolved molybdenum in an amount between 200 and 250 g/l;
(c) adding nitric acid and water to said second fraction to form a recycled mixture;
(d) returning said recycled mixture to said reaction vessel; and
(e) combining said recycled mixture with said acid mixture whereby the amount of molybdenum in the resulting mixture is between 140 and 180 g/l.

8. The process of claim 7, wherein the step of reacting said filament coil with said acid mixture is conducted at a temperature of between room temperature and 60° C. to thereby remove a substantial portion of said core wire and raising said reaction temperature to up to 80° C. to remove the remaining portion of said core wire.

9. The process of claim 1, wherein said oxygen containing gas is air.

10. A process for dissolving a molybdenum core wire in a tungsten filament coil comprising:
(a) reacting said filament coil in a sealed reaction vessel fitted with at least one liquid trap with an acid mixture consisting essentially of 2.8 to 3.2 moles of nitric acid, 12.5 to 13.5 moles of sulfuric acid and 7.5 to 8.5 moles of water in the presence of air at a temperature of between room temperature and 60° C. to thereby dissolve said core wire; and
(b) continuously monitoring the amount of air by a pressure sensing device being capable of sensing the level of liquid in said liquid trap and comprising an upper and lower pressure sensing region, said pressure sensing device being connected to an air supply, the amount of liquid in said liquid trap varying directly with the amount of air in said reaction vessel, wherein when the level of liquid in said liquid trap is at the same level as said lower pressure sensing region, the pressure of air in said reaction vessel is about −1.6 kPa at which point air is supplied to said reaction vessel and when the level of liquid is at the same level as said upper pressure sensing region, the pressure of air in said reaction vessel is about 0.6 kPa at which point the supply of air to said reaction vessel is stopped.

11. The process of claim 10 further comprising (a) removing a spent acid mixture from the reaction vessel;

(b) separating said spent acid mixture into a first fraction containing crystallized molybdic acid and a second fraction containing sulfuric acid and dissolved molybdenum in an amount between 200 and 250 g/l;

(c) adding nitric acid and water to said second fraction to form a recycled mixture;

(d) returning said recycled mixture to said reaction vessel; and (e) combining said recycled mixture with said acid mixture wherein the resulting mixture has an amount of molybdenum between 140 and 180 g/l.

12. The process of claim 10, wherein the step of reacting said filament coil with said acid mixture is conducted at a temperature of between room temperature and 60° C. to thereby remove a substantial portion of said core wire and raising said reaction temperature to up to 80° C. to remove the remaining portion of said core wire.

* * * * *